Patented Aug. 3, 1954

2,685,525

UNITED STATES PATENT OFFICE 2,685,525

MONOCRYSTALLINE REFRACTIVE MATERIAL AND METHOD FOR MAKING THE SAME

Leon Merker, New York, N. Y., assignor to National Lead Company, New York, N. Y., a corporation of New Jersey No Drawing. Application February 2, 1953, Serial No. 334,706

4 Claims. (Cl. 106—42)

This invention relates to monocrystalline strontium titanate and to methods of making and treating monocrystalline strontium titanate.

Monocrystalline strontium titanate is characterized by a high index of refraction (about 2.4) and a low reciprocal relative dispersion or $v$ value (about 13). Large single crystals of strontium titanate may be made which are clear, transparent and glass-like and such crystals have important optical applications because the index is substantially higher and the reciprocal relative dispersion substantially lower than those of the densest flint glasses. Whether clear or colored, the crystals have important gem stone and other applications because of their high refraction and dispersion.

One broad use of optical materials having high refractive indices and high dispersion is in the manufacture of lenses and prisms. For example, materials having a high index of refraction are utilized in the construction of optical systems such as telescopic or high magnification microscopic objectives. Furthermore combinations of optical materials which individually possess widely variant optical properties are used to prepare achromatic lenses. High dispersion qualities are also useful for making prisms and the like. Highly refractive single crystal material is also useful for the preparation of ornamental objects such as gem stones. Synthetic gems of various types and colors are in great demand for both personal adornment and industrial uses.

An objective of this invention therefore is to provide a monocrystalline composition which possesses exceedingly high index of refraction with a high dispersion or relatively low $v$ value. A further object is to provide a method for producing glass-like material suitable for manufacture of lenses, prisms, gem stones and the like. Another object is to provide a rapid process for the manufacture of monocrystalline material which is economical and simple to operate. These and other objects will become apparent from the following more complete description of the invention.

Broadly this invention contemplates a monocrystalline mass of strontium titanate and a method for producing the same which comprises periodically introducing into an oxygen-hydrogen flame a powdered composition consisting essentially of strontium titanate and an effective amount up to 1.0% of oxidic compound of aluminum and crystallizing the melted material as a monocrystalline mass in the form of a boule and subsequently subjecting the boule to an oxidizing treatment at temperature from about 650° C. to about 1700° C.

Substantially any oxidic compound of aluminum may be used, for example, the oxide or any compound of aluminum which forms the oxide at the temperatures employed.

This application is a continuation-in-part of co-pending application Serial No. 252,906, filed October 24, 1951, now U. S. Patent No. 2,628,156, issued February 10, 1953, which describes and claims monocrystalline strontium titanate prepared without the addition of modifying or coloring agents. The process for preparation of the single crystals of strontium titanate is more fully described in co-pending application Serial No. 334,704, filed February 2, 1953, entitled "Refractive Material."

The term strontium titanate is intended to embrace both pure and substantially pure $SrTiO_3$ material, the latter which contains impurities or added coloring or modifying agents either present or added which are of a nature and in amount so as to not affect the monocrystalline structure nor alter the desired color of the strontium titanate material produced. In most cases the impurities are held to a minimum and ordinarily will not exceed a few tenths of a per cent and modifying or coloring agents are added in the amount necessary to produce the desired effect.

In order to prepare a monocrystalline mass by co-fusing particles of strontium titanate, it is necessary to employ high temperatures. Strontium titanate melts in the neighborhood of about 2050° C. and it is therefore preferred to use an oxygen-hydrogen flame in order to obtain the necessary temperatures without the possible introduction of impurities.

It is convenient to drop the finely divided particles of the strontium titanate composition into the area of intense heat formed by the oxygen-hydrogen flame, i. e. in or near the oxygen cone. Within this area the strontium titanate composition melts and as it cools below the melting point crystallizes as a single crystal on a base which holds the molten strontium titanate material. In order to start such a single crystal to form it is desirable to first form a seed and then gradually build up the amount of molten material on the seed to form the crystal.

Such a procedure allows the crystal to build up upon itself gradually increasing in diameter until a boule or carrot-shaped single crystal of strontium titanate is formed. The size of the orifices of the oxygen-hydrogen torch determines the size of the intensely heated zone which in turn, determines the diameter of the carrot-shaped crystal produced.

It is preferred to employ a strontium titanate powdered material which is substantially free from objectionable or incompatible impurities which detrimentally would affect the crystal structure. Starting material should be finely divided and fairly uniform in size. Such a material may be conveniently prepared by first reacting titanium oxalate with strontium chloride to precipitate strontium titanium oxalate. After thoroughly washing the strontium titanium oxalate, it is heated at a temperature of at least 500° C. to remove the oxalate portion thus forming strontium titanate. Preferably this strontium titanate material is then crushed and ground to obtain finely divided material from which the strontium titanate single crystal is subsequently formed.

The monocrystalline strontium titanate described in copending application Serial No. 252,906, filed October 24, 1951, is crystallized as a boule. This boule is substantially black in color. The black boule is subsequently subjected to an oxidizing heat treatment to produce the white transparent crystal. The time required for the oxidation treatment is relatively long before the transparent crystal is obtained. By the process of the instant invention, however, which employs alumina as an addition agent to the strontium titanate feed material the time required for the oxidation treatment is reduced. It has been found that added amounts of alumina as low as about 0.005% are effective.

When employing small amounts of alumina in the feed material the color of the boule as produced changes upon the amount of alumina used. As it is formed, it has been found that employing boule feed materials which contain higher amounts of alumina produce pinkish and substantially transparent boules, while employing lower amounts of alumina in the feed material produces the blue-black colors. It has been found that when about 0.005% to about 0.05% of the addition agent is added to the strontium titanate feed material that a boule of substantially blue-black color is obtained. When larger amounts of the addition agent are employed, i. e. from about 0.1% to about 1.0% a pinkish transparent color is obtained. Between about 0.05% and about 0.1% alumina addition, the boule obtained appears to be relatively transparent on its outer surface while the center remains black in color. Both colors, however, disappear upon subjecting the boule to the subsequent oxidation heat treatment. In order to show the effects of the various amounts of addition agent upon the color of the boule as formed and the color of the boule after the oxidation treatment, the following table is presented showing the various percentage ranges which produce the various colors.

| Aluminum Oxide added | Color of boule as produced | Color of boule after oxidation treatment |
| --- | --- | --- |
| 0.005% to 0.05% | blue black | substantially white. |
| >0.05% to 0.1% | outside—relatively transparent; center—black. | Do. |
| >0.1% to 1.0% | pinkish and substantially transparent. | Do. |

The boules described in the above table were prepared in the following manner. Feed materials consisted of a mixture of strontium titanate and various quantities of the aluminum oxide. These feed materials were progressively fused by passing the powdered material through the flame. The fusions were carried out at temperatures between 2080° C. and 2150° C. The boule was grown on a pedestal as the fused material was progressively crystallized. As produced, the boules were substantially either pinkish or black in color. They were substantially carrot-shaped and had a more or less frosted outer surface. When split, the interior surface of the pieces is vitreous and shiny. These boules were subsequently subjected to an oxidizing treatment, in either whole or split form at temperatures from 650° C. to 1700° C. for 6 hours to 120 hours. These oxidized crystals were then cut and polished to form beautiful substantially white gems or optical bodies such as lenses, prisms, and the like. The time required for oxidation to produce the white transparent boule was reduced from that required for boules containing no alumina.

From the above description a rapid process is provided for the manufacture of a monocrystalline composition which is economical and simple to employ. Monocrystalline composition which has a high index of refraction with a high dispersion is also provided by the instant invention. Employing the method of the instant invention provides a reduction in time in the subsequent oxidation step to produce substantially white single crystals.

While this invention has been described and illustrated by the examples shown, it is not intended to be strictly limited thereto and other modifications and variations may be employed within the scope of the following claims.

I claim:

1. Highly refractive glass-like monocrystalline composition consisting essentially of strontium titanate and amount from about 0.005% to about 1.0% by weight of oxidic compound of aluminum.

2. Highly refractive colored glass-like monocrystalline composition consisting essentially of strontium titanate and amount from about 0.005% to about 1.0% by weight of oxidic compound of aluminum.

3. Method for the preparation of a colored monocrystalline mass of strontium titanate which comprises periodically introducing an oxygen-hydrogen flame into a powdered composition consisting essentially of strontium titanate and amount from about 0.005% to about 1.0% by weight of aluminum oxide and crystallizing the melted material as a monocrystalline mass in the form of a colored boule.

4. Method for the production of a monocrystalline mass of strontium titanate which comprises periodically introducing into an oxygen-hydrogen flame a powdered composition consisting of strontium titanate and an amount from about 0.005% to 1.0% by weight of aluminum oxide and crystallizing the melted material as a monocrystalline mass in the form of a boule and subsequently subjecting the boule to an oxidizing atmosphere at temperature from about 650° C. to about 1700° C. to produce a substantially white boule.

No references cited.